United States Patent [19]

Kishi

[11] Patent Number: 4,593,665

[45] Date of Patent: Jun. 10, 1986

[54] FUEL SUPPLY CONTROL METHOD FOR MULTICYLINDER INTERNAL COMBUSTION ENGINES

[75] Inventor: Noriyuki Kishi, Tokyo, Japan

[73] Assignee: Honda Giken Kogyo Kabushiki Kaisha, Tokyo, Japan

[21] Appl. No.: 698,638

[22] Filed: Feb. 6, 1985

[30] Foreign Application Priority Data

Feb. 9, 1984 [JP] Japan .................. 59-22267

[51] Int. Cl.$^4$ .......................... F02M 51/00
[52] U.S. Cl. .................... 123/478; 123/490
[58] Field of Search ........... 123/478, 480, 486, 487, 123/490, 491, 492

[56] References Cited

U.S. PATENT DOCUMENTS 4,229,793 10/1980 Yoshida et al. ............ 123/486 X
4,418,674 12/1983 Hasegawa et al. ........... 123/491
4,459,961 7/1984 Nishimura et al. ......... 123/478 X
4,495,927 1/1985 Yamato .................... 123/491

FOREIGN PATENT DOCUMENTS 38657 9/1971 Japan .
45652 12/1974 Japan .
52537 5/1981 Japan .................. 123/478

Primary Examiner—Tony M. Argenbright
Attorney, Agent, or Firm—Lyon & Lyon

[57] ABSTRACT

A fuel supply control method for multicylinder internal combustion engines, includes calculating the quantity of fuel being supplied to the engine in response to operating conditions of the engine, and sequentially supplying quantities of fuel corresponding to the calculated values into respective corresponding ones of the cylinders. The fuel quantity is calculated in synchronism with generation of pulses of a timing signal equal in number to the number of the cylinders at predetermined crank angles of the engine per one cycle of the engine. The supply of fuel to the engine is started immediately upon completion of the calculation of the fuel quantity, when the detected engine rotational speed is determined to be lower than a predetermined value, while it is started immediately upon generation of a first pulse of the timing signal generated immediately after completion of the calculation, when the detected engine rotational speed is determined to be higher than the predetermined value, thereby minimizing fluctuations in the air-fuel ratio at transition from a low engine speed region to a high engine speed region and vice versa.

8 Claims, 8 Drawing Figures

FUEL SUPPLY CONTROL METHOD FOR MULTICYLINDER INTERNAL COMBUSTION ENGINES

BACKGROUND OF THE INVENTION

This invention relates to a fuel supply control method for multicylinder internal combustion engines, and more particularly to a control method of this kind which is adapted to control the sequence of fuel injections into engine cylinders at high speed operation of the engine in particular.

A fuel supply control method for multicylinder internal combustion engines has generally been employed, which comprises successively calculating the quantity of fuel to be supplied to the engine to values dependent upon operating conditions of the engine, in synchronism with generation of pulses of a crank angle signal sequentially generated at predetermined crank angles of the engine, and successively supplying the calculated quantities of fuel to the engine cylinders in predetermined sequence.

According to such conventional sequential fuel supply method, when the engine speed is low, the time interval between adjacent pulses of the crank angle signal sequentially generated is larger than the maximum possible time required for calculating the fuel quantity such that even if the calculation is started upon generation of each pulse of the crank angle signal and the supply or injection of the calculated quantity of fuel is started immediately after completion of the calculation, almost all the fuel thus supplied is sucked into the corresponding cylinder. Thus, in a low engine speed region, a required air-fuel ratio and accordingly required driveability of the engine can be achieved with the conventional method.

However, when the engine speed is so high that the time interval between adjacent pulses of the crank angle signal sequentially generated is very close to the maximum possible calculating time, the injection timing will be too late relative to the timing of the suction stroke of the corresponding cylinder if the fuel injection is started after completion of the calculation, failing to positively achieve a required air-fuel ratio and accordingly required engine driveability.

To overcome this disadvantage, there have been proposed a method of decreasing the frequency of calculation of the fuel quantity, for instance, effecting the calculation one time per several pulses of the crank angle signal sequentially generated during high speed operation of the engine, and then injecting the calculated quantity of fuel into two cylinders in a group of two groups at the same time or into all the four cylinders at the same time in the case of a four cylinder engine (Japanese Patent Publications Nos. 47-38657 and 49-45652), and a method of holding fuel injection immediately after completion of the calculation, and starting the fuel injection of the calculated quantity into the corresponding cylinder upon generation of a crank signal pulse after execution of one cycle of the cylinder, thus continually effecting sequential injection in a high engine speed region as in a low engine speed region.

Figure 1:
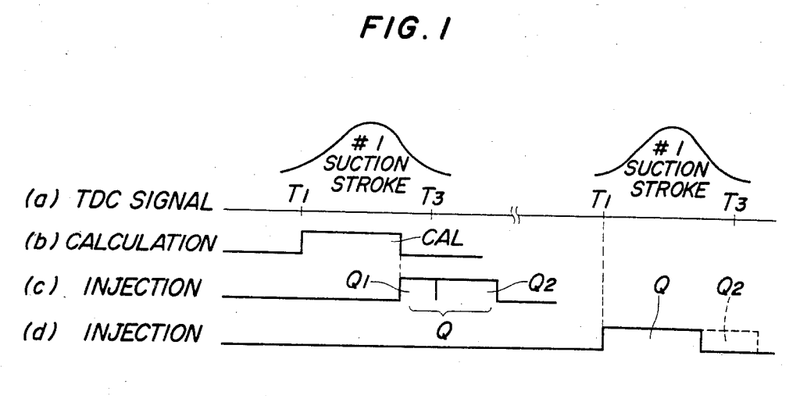

However, according to the former proposed method, there can occur a large time lag, particularly in between the completion of the calculation and the start of fuel injection, thus suffering from low responsiveness to changes in the operating condition of the engine and accordingly degraded engine driveability. On the other hand, according to the latter proposed method, upon changeover of the injection manner at transition from the low engine speed region to the high engine speed region, there can occur a large change in the injection timing relative to the suction stroke of the cylinder(s), leading to fluctuations in the air/fuel ratio and accordingly degraded engine driveability. That is, referring to FIG. 1 showing the latter proposed method, if in the low engine speed region a calculation CAL is started upon generation of a pulse of the crank angle signal corresponding to a cylinder #1 [(b) of FIG. 1] and injection of the calculated quantity of fuel is started immediately upon completion of the calculation, the injection starting timing will become delayed relative to the cylinder suction stroke as the engine speed becomes higher [(c) of FIG. 1], resulting in that only part Q1 of the injection fuel is actually sucked into the cylinder #1, while the remainder of the injected fuel remains within the intake pipe and is sucked into the next cylinder during the suction stroke thereof. That is, a fuel quantity $Q'2$ remaining in the intake pipe at the suction stroke of a preceding cylinder (nearly equal to the remaining fuel quantity Q2) is sucked into a present cylinder together with a fuel quantity Q1 just injected. Therefore, so long as the engine is operating at a constant speed, almost the same fuel quantity Q is sucked into each of the cylinders, and thus neither air-fuel ratio fluctuation nor degradation of the engine driveability takes place. On the other hand, upon transition from the low engine speed region to the high engine speed region, as shown at (d) in FIG. 1, fuel injection into each cylinder is started upon generation of a crank angle signal pulse T1 after execution of one cycle of the cylinder from the completion of the calculation for the cylinder, that is, the injection timing is largely retarded relative to the starting time of an immediately preceding fuel injection as shown at (c) in FIG. 1. In addition, all of a fuel quantity Q obtained by the immediately preceding calculation CAL and now injected upon generation of the pulse T1 and a fuel quantity Q2 remaining unsucked in the intake pipe at the immediately preceding injection are sucked together into the cylinder #1, suddenly overriching the air-fuel ratio and accordingly causing a sudden change in the engine speed, i.e. operating shock, or temporary degradation in the driveability.

SUMMARY OF THE INVENTION

It is an object of the invention to provide a fuel supply control method for multicylinder internal combustion engines, which employs a sequential fuel supply method, and is capable of minimizing fluctuations in the air-fuel ratio at transition from a low engine speed region to a high engine speed region and vice versa, thereby preventing operating shock of the engine.

It is another object of the invention to provide a fuel supply control method of this kind which is capable of supplying in an accurate manner a calculated quantity of fuel into each one of the cylinders of the engine particularly in a high engine speed region.

The present invention provides a fuel supply control method for an internal combustion engine having a plurality of cylinders, including calculating the quantity of fuel to be supplied to the engine in response to operating conditions of the engine, and sequentially supplying quantities of fuel corresponding to the calculated values into respective corresponding ones of the cylinders.

The method according to the invention is characterized by comprising the steps of: (a) generating pulses of a timing signal equal in number to the number of the cylinders at predetermined crank angles of the engine per one cycle of the engine; (b) detecting the rotational speed of the engine; (c) calculating the quantity of fuel to be supplied to the engine, in synchronism with generation of the timing signal; (d) determining whether or not the detected engine rotational speed is higher than a predetermined value; (e) starting the supply of fuel to the engine immediately upon completion of the above calculation of the fuel quantity, when the detected engine rotational speed is determined to be lower than the predetermined value; and (f) starting the supply of fuel to the engine immediately upon generation of a first pulse of the timing signal generated immediately after completion of the calculation of the fuel quantity, when the detected engine rotational speed is determined to be higher than the predetermined value.

Preferably, when the detected engine rotational speed is determined to be higher than the predetermined value, the calculation of the fuel quantity is effected upon generation of every other pulse of the timing signal.

Also preferably, the step (b) and/or the step (d) is executed upon generation of each pulse of the timing signal.

The predetermined value of the engine rotational speed is set at a value assumed when the time interval between adjacent pulses of the timing signal is equal to or slightly larger than the maximum possible time required for completing a calculation of the fuel quantity.

Preferably, the predetermined value of the engine rotational speed is set at different values between the time of increase of the engine rotational speed and the time of decrease of same.

Further preferably, the step (f) comprises supplying the engine with a quantity of fuel equal to a calculated value obtained by a first calculation of the fuel quantity started upon generation of one of said every other pulse of the timing signal, upon generation of each subsequent pulse of the timing signal, from a time the first calculation is completed to a time a second calculation of the fuel quantity immediately following the first calculation and started upon generation of an immediately following one of said every other pulse of the timing signal is completed.

The above and other objects, features and advantages of the invention will be more apparent from the ensuing detailed description taken in conjunction with the accompanying drawings.

BRIEF DESCRIPTION OF THE DRAWINGS

FIGS. 1(a-d) are a timing chart showing the timing relationship between generation of TDC signal, calculation and injection according to a conventional fuel injection control method;

FIGS. 2(a-d) are a timing chart showing an injection manner according to the present invention, applicable during engine operation in a low engine speed and steady operating condition;

FIGS. 3(a-d) are a timing chart showing an injection manner according to the present invention, applicable during engine operation in a low engine speed region wherein the engine speed changes;

FIGS. 4(a-d) are a timing chart showing an injection manner according to the present invention, applicable during engine operation in a high engine speed and steady operating condition;

FIGS. 5(a-d) are a timing chart showing an injection manner according to the present invention, applicable at transition between a low engine speed region and a high engine speed region;

DETAILED DESCRIPTION

The method according to the invention will now be described in detail with reference to the drawings.

Figure 2:
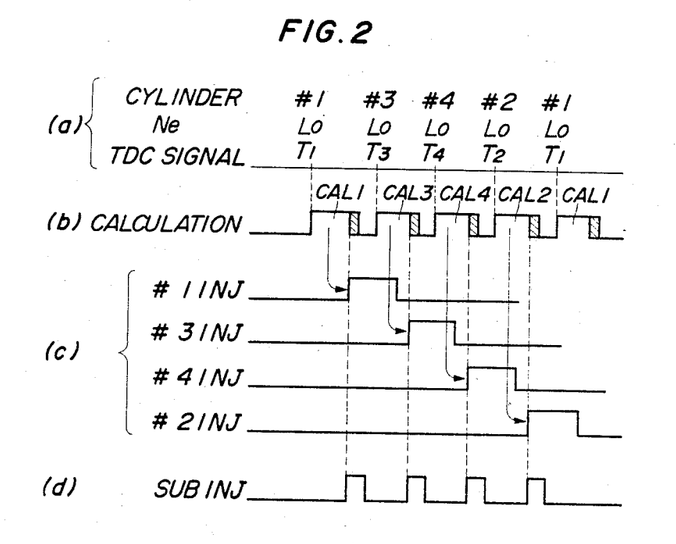

Referring first to FIG. 2, an injection manner according to the present invention is shown, which is applicable during engine operation in a low engine speed and steady operating condition. When the rotational speed of the engine is lower than a predetermined value ("Lo" in FIG. 2), a calculation of the fuel quantity is effected each time one of sequential pulses of a crank angle signal (hereinafter called "the TDC signal") is generated with rotation of the engine. Immediately upon completion of the calculation, an injection into one of engine cylinders is started, which lasts for a period of time corresponding to the calculated value. Thereafter, similar calculations and injections to the above are carried out with respect to the other cylinders, thus performing sequential injection. More specifically, calculations CAL1, CAL3, CAL4, and CAL2 are started [(b) in FIG. 2], respectively, when pulses T1, T3, T4, and T2 of the TDC signal are generated per one cycle of the engine as shown at (a) in FIG. 2, and injections of the calculated quantities of fuel are effected sequentially into the engine cylinders through respective injectors INJ #1, INJ #3, INJ #4, and INJ #2 immediately upon completion of the respective calculations. While the engine is operating in such low engine speed region, almost all the injected fuel will be sucked into each corresponding cylinder.

The predetermined engine speed value NEIC is set at a value assumed when the time interval between adjacent pulses of the TDC signal is equal to or slightly larger than the maximum possible time required for completing a calculation of the fuel quantity (e.g. 4-5 msec). If this predetermined value NEIC is provided with a hysteresis margin, that is, if it is set to different values between the time of increase of the engine speed and the time of decrease of same, more stable fuel supply control can be achieved which is free from fluctuations in the air-fuel ratio, etc.

In FIG. 2 as well as in FIGS. 3-5, hereinafter referred to, the hatched portion of the trailing edge of each of the calculation times CAL1-CAL4 represents an excess time (e.g. 1-2 msec) which may be equal to the sum of a computing time for calculating a fuel increment at acceleration of the engine in synchronism with generation of an asynchronous timing signal with a constant period asynchronous with the engine rotation, and a background calculating time for calculating basic fuel injection periods TiM, TiS and correction coefficients and correction terms, hereinafter referred to.

Figure 3:
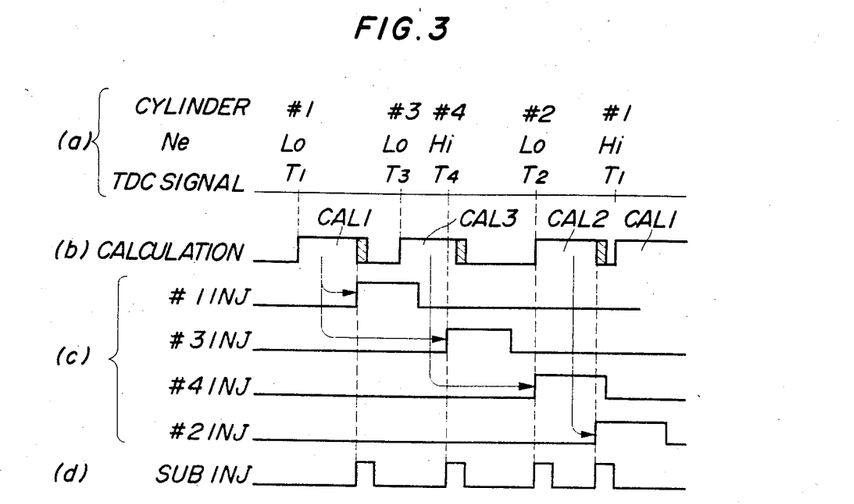

Referring next to FIG. 3, another injection manner according to the present invention is shown, which is applicable when the engine speed suddenly rises during calculation of the fuel injection quantity according to the FIG. 2 injection manner in the low engine speed region wherein the engine speed Ne is lower than the aforementioned predetermined value NEIC. According to the FIG. 3 manner, when a pulse of the TDC signal is generated during a present calculation of the fuel injection quantity, an injection is started into a corresponding cylinder using a fuel injection period value obtained in a loop immediately before the last loop, immediately upon the generation of the above TDC signal pulse. Even when the present calculation is completed after the above injection, an injection into the next cylinder is not effected immediately. For example, referring to FIG. 3, in the event that the engine speed Ne is determined to be lower than the predetermined value NEIC as indicated as "Lo" in FIG. 3 at the times of generation of TDC signal pulses T1 and T3, and during a calculation CAL3 started upon generation of the TDC signal pulse T3 the engine speed rises as indicated as "Hi" in FIG. 3 so that the next TDC signal pulse T4 is generated before completion of the calculation CAL3, an injection is effected into a corresponding cylinder #3 using a calculated value obtained by an immediately preceding calculation CAL1 which was started upon generation of the preceding TDC signal pulse T1. Even when the calculation CAL3 is completed immediately after the start of the injection into the cylinder #3, the next injection into a cylinder #4 is not effected immediately, but it is effected immediately upon generation of the next TDC signal pulse T2. Then, immediately upon the generation of the TDC signal pulse T2 a regular calculation CAL2 is started. If no TDC signal pulse is generated during the calculation CAL2, an injection is effected into a cylinder #2 immediately upon completion of the calculation CAL2.

Figure 4:
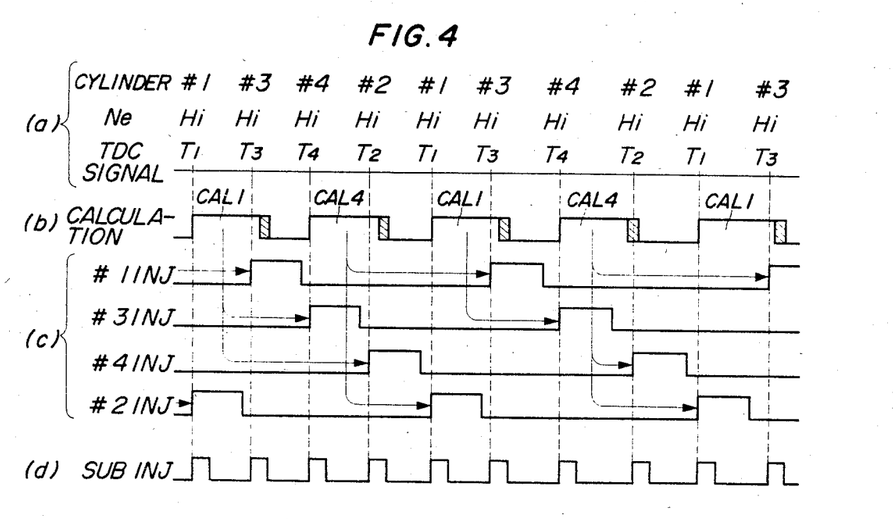
Figure 5:
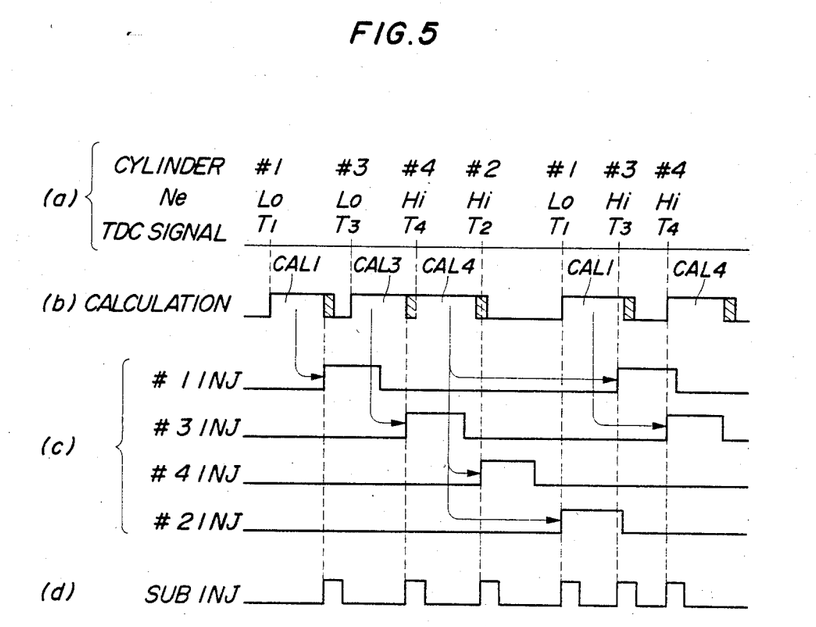

FIG. 4 shows an injection manner according to the method of the invention, which is applicable in the event that TDC signal pulses are continually generated before respective calculations of the fuel injection quantity are finished, such as during engine operation in a high engine speed region wherein the engine rotational speed Ne is higher than the predetermined value NEIC. According to this manner, a calculation is effected upon generation of every other TDC signal pulse, and an injection is effected using a calculated value obtained by the same calculation, immediately upon generation of a TDC signal pulse generated immediately after completion of the same calculation, as distinct from the FIG. 2 and FIG. 3 manners wherein a calculation is effected upon generation of every TDC signal pulse insofar as no preceding calculation is then being executed. According to the illustrated example of FIG. 4, first a calculation CAL1 is started immediately upon generation of a TDC signal pulse T1, while an injection is started into a cylinder #2 immediately upon the generation of the same TDC signal pulse T1, using a calculated value obtained immediately before the generation of the pulse T1 (the calculation time of which is not shown). If the next TDC signal pulse T3 is generated during execution of the calculation CAL1, an injection into a cylinder #1 is started using the above-mentioned immediately preceding calculated value, immediately upon the generation of the TDC signal pulse T3, while continuing the calculation CAL1. Then, when the next TDC signal pulse T4 is generated after completion of the calculation CAL1, an injection is started into a cylinder #3 immediately upon the generation of the pulse T4 and using a calculated value resulting from the calculation CAL1. At the same time, the generation of the pulse T4 causes starting the next calculation CAL4. When a further TDC signal pulse T2 is generated during execution of the calculation CAL4, an injection is effected into a cylinder #4, using again the calculated value of the calculation CAL1, while a calculated value resulting from the calculation CAL4 is used for injection into a cylinder #2 immediately upon generation of a further TDC signal pulse T1.

With the above described manner of fuel injection, if the engine rotational speed Ne was determined to be lower than the predetermined value NEIC at the time of generation of an immediately preceding TDC signal pulse and it is determined to be higher than the same value NEIC at the time of generation of a present TDC signal pulse, the calculation is started immediately upon the generation of the present pulse, if the calculating device is not calculating now, that is, the immediately preceding calculation has already been finished. To be specific, referring to FIG. 5, assuming that the engine speed Ne is determined to be lower than the predetermined value NEIC at the time of generation of a TDC signal pulse T3, and immediately upon generation of the pulse T3 a calculation CAL3 is started, and the next TDC signal pulse T4 is generated before completion of the calculation CAL3, an injection is started into a cylinder #3 immediately upon completion of the calculation CAL3. Then, if the engine speed Ne is determined to be higher than the predetermined value NEIC at the time of generation of the pulse T4, the next calculation CAL4 is started immediately upon generation of the pulse T4, since the calculating device has already finished the calculation CAL3 and is then at idle. If this calculation CAL4 is completed before generation of the next TDC signal pulse T2 and the engine speed Ne is determined to be still higher than the predetermined value NEIC at the time of generation of the pulse T2, an injection is started into a cylinder #4 immediately upon generation of the pulse T2 using the calculated value of the calculation CAL4. Further, the same calculated value of the calculation CAL4 is used for the next injection into a cylinder #2 immediately upon generation of the next TDC signal pulse T1, while simultaneously the next calculation CAL1 is started.

In this way, a sequential injection is carried out even when the engine is operating in a high engine speed region (the quasi-sequential injection).

Figure 6:
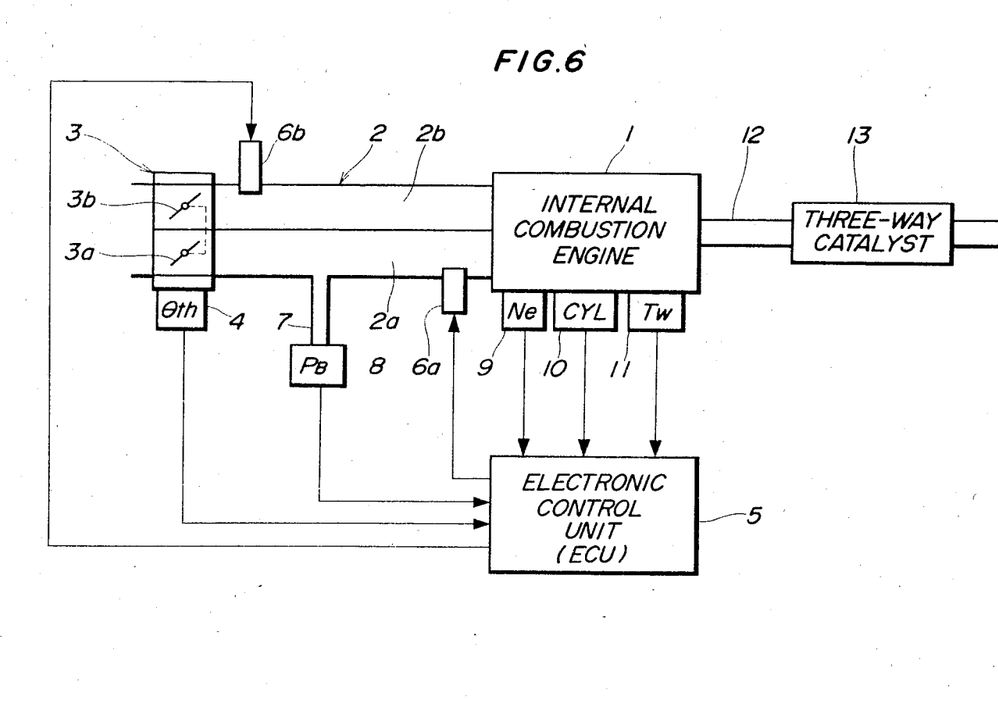
FIG. 6 is a block diagram showing the whole arrangement of a fuel supply control system for an internal combustion engine, to which is applied the method according to the present invention.

FIG. 6 illustrates the whole arrangement of a fuel supply control system to which is applied the method according to the present invention. Reference numeral 1 designates an internal combustion engine which may be a four-cylinder type, for instance. The engine 1 has main combustion chambers which may be four in number and sub combustion chambers communicating with the respective main combustion chambers, none of which are shown. An intake pipe 2 is connected to the engine 1, which comprises a main intake pipe 2a communicating with each main combustion chamber, and a sub intake pipe 2b communicating with each sub combustion chamber. Arranged across the intake pipe 2 is a throttle body 3 which accommodates a main throttle valve 3a and a sub throttle valve 3b mounted in the main intake pipe and the sub intake pipe, respectively, for synchronous operation of controlling the opening area of the respective intake pipes. A throttle valve opening sensor 4 is connected to the main throttle valve 3a for detecting its valve opening and converting same into an electrical signal which is supplied to an electronic control unit (hereinafter called "the ECU") 5. Main injectors 6a and a sub injector 6b are arranged in the main intake pipe 2a and the sub intake pipe 2b respectively. The main injectors 6a correspond in number to the engine cylinders and are each arranged in the main intake pipe 2a at a location slightly upstream of an intake valve, not shown, of a corresponding engine cylinder, while the sub injector 6b, which is single in number, is arranged in the sub intake pipe 2b at a location slightly downstream of the sub throttle valve, for supplying fuel to all the engine cylinders. The main injectors 6a and the sub injector 6b are electrically connected to the ECU 5 in a manner having their valve opening periods or fuel injection quantities controlled by driving signals supplied from the ECU 5, while they are connected to a fuel pump, not shown, to be supplied with pressurized fuel therefrom.

On the other hand, an absolute pressure sensor 8 communicates through a conduit 7 with the interior of the main intake pipe 2a at a location immediately downstream of the main throttle valve 3a, for detecting absolute pressure in the main intake pipe 2a and supplying an electrical signal indicative of detected absolute pressure to the ECU 5. An engine speed sensor (hereinafter called "the Ne sensor") 9 and a cylinder-discriminating sensor (hereinafter called "the CYL sensor") 10 are arranged in facing relation to a camshaft, not shown, of the engine 1 or a crankshaft of same, not shown. The former 9 is adapted to generate one pulse of a crank angle signal or TDC signal at one of predetermined crank angles each time the engine crankshaft rotates through 180 degrees, while the latter 10 is adapted to generate one pulse at a particular crank angle of a particular engine cylinder. The pulses generated by these sensors 9, 10 are also supplied to the ECU 5.

An engine temperature sensor (hereinafter called "the TW sensor") 11 is mounted on the main body of the engine 1 for detecting the engine temperature, for instance the temperature of engine cooling water TW, while an intake-air temperature sensor, not shown, is arranged in the main intake pipe 2a for detecting the intake air temperature. These sensors are also electrically connected to the ECU 5 for supplying electrical signals indicative of detected engine temperature and intake air temperature thereto. A three-way catalyst 13 is arranged in an exhaust pipe 12 extending from the main body of the engine 1 for purifying ingredients HC, CO, and NOx contained in the exhaust gases. An $O_2$ sensor, not shown, is inserted in the exhaust pipe 12 at a location upstream of the three-way catalyst 13 for detecting the concentration of oxygen in the exhaust gases and supplying an electrical signal indicative of a concentration value to the ECU 5.

Further electrically connected to the ECU 5 are a sensor for detecting atmospheric pressure and a starter switch for actuating the engine starter, and a battery for power supply, for supplying electrical signals indicative of detected atmospheric pressure, on-off positions of the starter switch and the battery voltage to the ECU 5.

The ECU 5 is responsive to the engine operating parameter signals supplied from the above-mentioned various sensors to calculate the fuel injection periods TOUTM and TOUTS for the main injectors 6a and the sub injector 6b, by the use of the following equations:

$$TOUTM = TiM \times K1 + K2 \quad (1)$$

$$TOUTS = TiS \times K'1 + K'2 \quad (2)$$

where TiM and TiS are basic fuel injection periods for the main injectors 6a and the sub injector 6b, respectively, which are read from a storage means within the ECU 5 on the basis of detected intake pipe absolute pressure PB and engine rotational speed Ne, for instance. K1, K2, K'1 and K'2 represent correction coefficients and correction terms which are determined by calculations using respective equations, etc. on the basis of the values of engine operating parameter signals supplied from various sensors such as throttle valve opening sensor 4, intake pipe absolute pressure sensor 8, Ne sensor 9, TW sensor 11, $O_2$ sensor, intake-air temperature sensor, and atmospheric pressure sensor, so as to optimize various characteristics of the engine such as startability, emissions, fuel consumption, and accelerability.

The ECU 5 operates on the calculated fuel injection periods TOUTM, TOUTS to supply the ECU 5 with driving signals for opening the main injectors 6a and the sub injector 6b. The sub injector 6b is opened in synchronism with opening of each of the main injectors 6a, as shown in FIGS. 2 through 5 referred to before.

Figure 7:
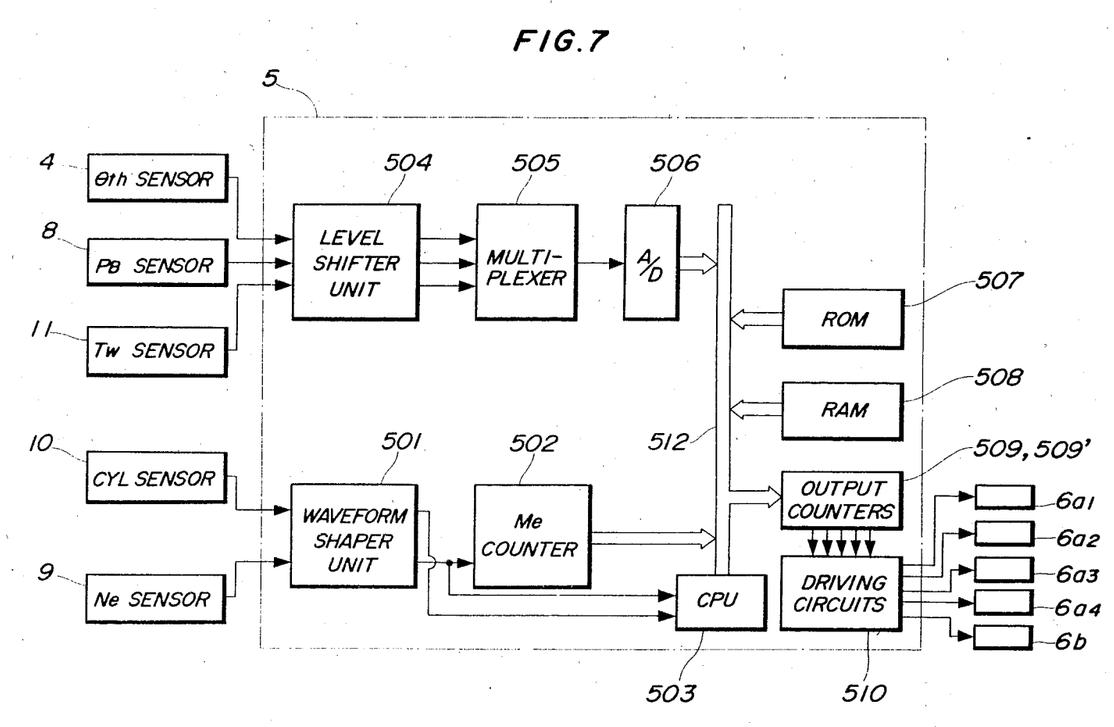
FIG. 7 is a block diagram showing an example of the interior construction of an electronic control unit appearing in FIG. 5.

FIG. 7 shows a circuit configuration within the ECU 5 in FIG. 6. An output signal of the Ne sensor 9 in FIG. 6 is applied to a waveform shaper unit 501, wherein its pulse waveform is shaped, and the shaped signal is successively supplied to a central processing unit (hereinafter called "the CPU") 503, as well as to an Me counter 502, as the TDC signal. The Me counter 502 counts the time interval between a preceding pulse of the TDC signal and a present pulse of the same signal, inputted thereto from the Ne sensor 9. Therefore, its counted value Me corresponds to the reciprocal of the actual engine rotational speed Ne. The Me counter 502 supplies the counted value Me to the CPU 503 via a data bus 512. Output pulses from the CYL sensor 10 are also shaped by the waveform shaper unit 501, and the shaped pulses are applied to the CPU 503.

The respective output signals from the throttle valve opening sensor 4, the intake pipe absolute pressure sensor 8, the TW sensor 11, and other engine operating parameter sensors, not shown, have their voltage levels shifted to a predetermined voltage level by a level shifter unit 504 and successively applied to an analog-to-digital converter 506 through a multiplexer 505. The analog-to-digital converter 506 successively converts into digital signals analog output voltages from the aforementioned various sensors, and the resulting digital signals are supplied to the CPU 503 via the data bus 512.

Further connected to the CPU 503 via the data bus 512 are a read-only memory (hereinafter called "the ROM") 507, a random access memory (hereinafter called "the RAM") 508, a counter 509 for injection through the main injectors (6a1–6a4), a counter 509' for injection through the sub injector 6b, and a driving unit 510, the counters 509, 509' being formed by down counters. The RAM 508 temporarily stores various calculated values from the CPU 503, while the ROM 507 stores a control program to be executed within the CPU 503, Ti maps of basic fuel injection periods for the main injectors 6a and the sub injector 6b, values of the aforementioned correction coefficients and correction terms, etc. The CPU 503 executes the control program stored in the ROM 507 to calculate the fuel injection periods TOUTM, TOUTS for the injectors in response to the various engine operating parameter signals and by the use of the aforementioned equations (1), (2), and supplies the calculated period values to the counters 509, 509' via the data bus 512. The calculation of the fuel injection period for the main injectors and application of the calculated value to the counter 509 are effected in manners explained hereinbefore with reference to FIGS. 2 through 5. The counters 509, 509' start counting operations upon being supplied with respective starting command signals from the CPU 503 after having been loaded with the calculated period values from the CPU 503, and at the same time start generating output signals until their counts are reduced to zero. The driving unit 510 continually generates driving signals to selectively open the main injectors 6a1-6a4 as well as to open the sub injector 6b, as long as it is supplied with respective output signals from the counters 509, 509'. As mentioned above, the sub injector 6b is supplied with a driving signal for opening same in synchronism with supply of driving signals to the main injectors 6a. In FIG. 7, omitted is illustration of a data address bus and a control bus connecting between the CPU 503 and the Me value counter 502, the analog-to-digital converter 506, the ROM 507, the RAM 508, and the counters 509, 509'.

Figures 8, 8A:
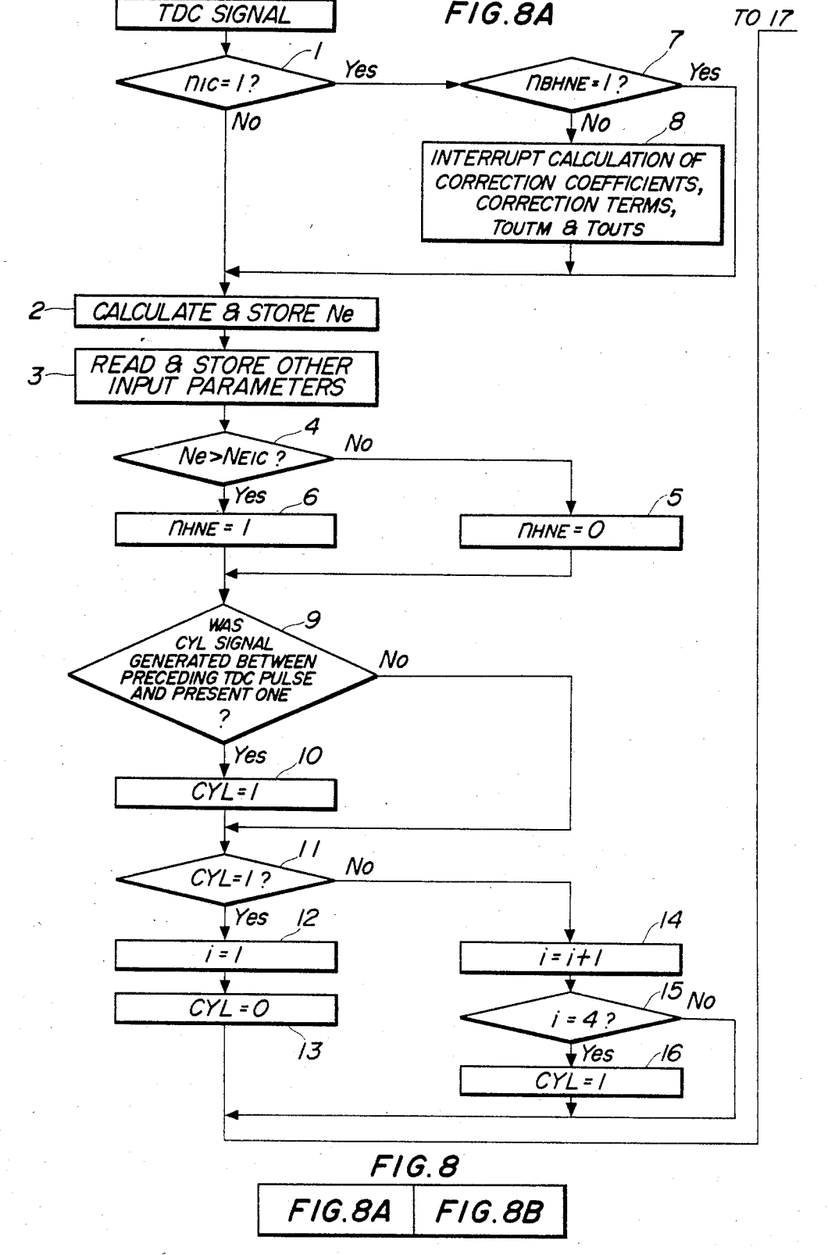
FIG. 8 is a flowchart showing a program for carrying out the method according to the present invention.
Figure 8B:
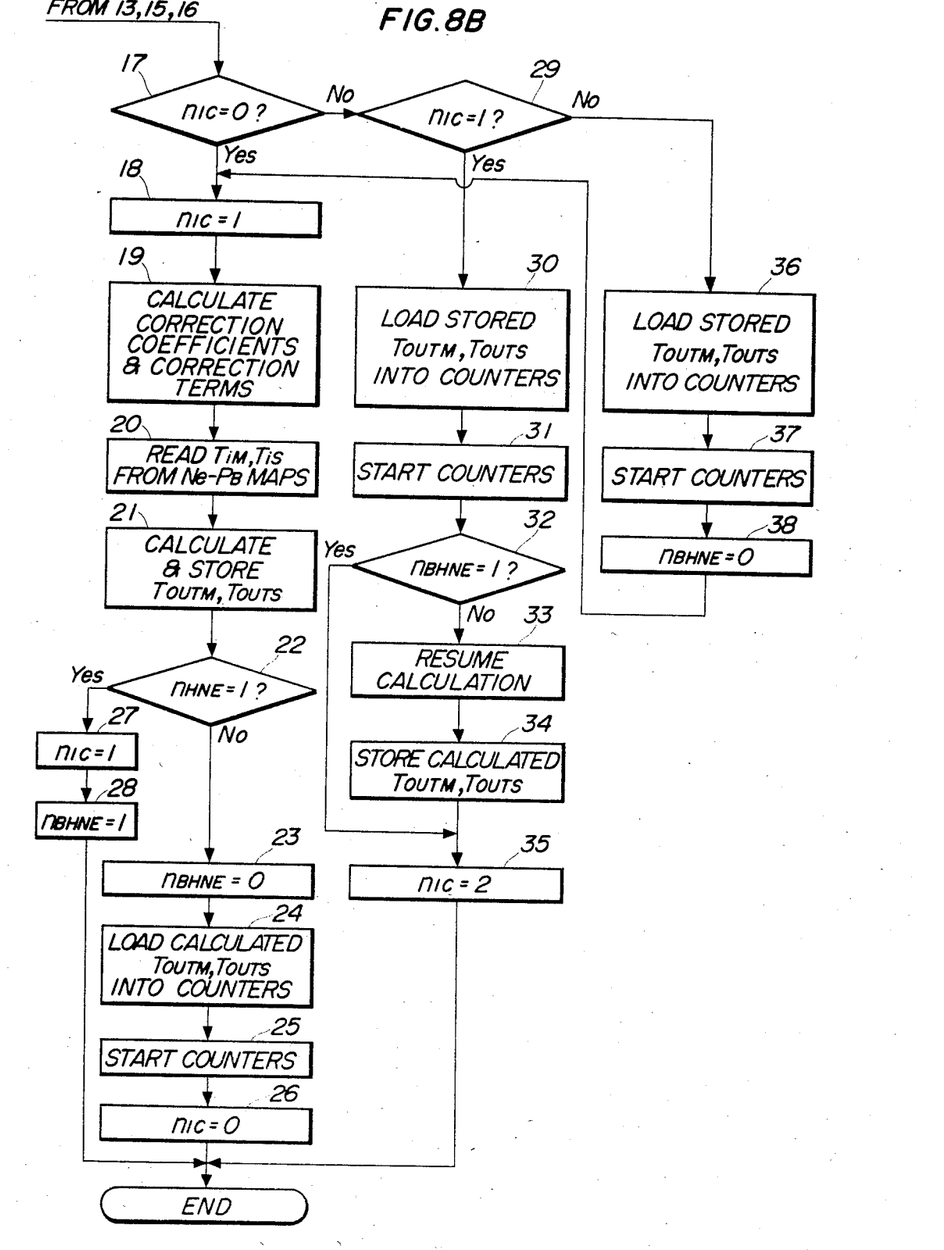

FIG. 8 shows a subroutine forming a main part of the control program and for executing the fuel supply control according to the method of the invention. First, it is determined at step 1 whether or not a flag NIC assumes a value of 1, each time a TDC signal pulse is generated. The flag NIC is set to or held at 0 at the time of initialization of the CPU 503 in FIG. 7 and during engine operation in a low engine speed region, while it is held at 1 while the CPU 503 executes calculations such as calculation of the fuel injection period TOUTM, TOUTS, that is, it is held at 1 even if the calculation is interrupted by inputting of a TDC signal pulse, and on the other hand, it is set to 2 when the calculated value of a calculation interrupted and resumed is stored into the RAM 508 in FIG. 7, as hereinafter described. If the answer to the question of step 1 is negative or no, that is, if the flag NIC shows a value other than 0, the engine rotational speed or rpm Ne is measured at step 2, and the measured Ne value is stored into the RAM 508, and at the same time input values of other parameters such as throttle valve opening $\theta$th, intake pipe absolute pressure PB, and engine temperature TW are read and stored into the RAM 508, at step 3. Then, it is determined at step 4 whether or not the engine rotational speed Ne is higher than the predetermined value NEIC. If the answer is no, a flag NHNE is set to 0 at step 5, while if the answer is yes, the flag NHNE is set to 1 at step 6. Then, it is determined at step 9 whether or not the cylinder-discriminating signal was generated between generation of an immediately preceding pulse of the TDC signal and a present pulse of same. If the answer is yes, a flag CYL for cylinder discrimination is set to 1 at step 10, while if the answer is no, the program jumps to step 11 wherein it is determined whether or not the flag CYL shows 1. If the answer to the question of step 11 is yes, a flag i is set to a value of 1 corresponding to a cylinder #1 to thus decide that a present injection is to be effected into the cylinder #1 at step 12, while the flag CYL is reset to 0 at Step 13, and then the program proceeds to step 17. If the answer to the question of step 11 is negative, 1 is added to the value of flag i indicative of the cylinder into which an immediately preceding injection was effected (step 14), to thus determine the cylinder to be supplied with fuel in the present loop. It is then determined at step 15 whether or not the flag i shows a value of 4 (in a four-cylinder engine), that is, the injecting cylinder is the last one of the four cylinders in one cycle of the engine. If the answer is yes, the cylinder-discriminating flag CYL is set to 1 at step 16, and the program proceeds to step 17, while if the answer is no, the program jumps from step 15 to step 17. In this way, the cylinder into which the present injection is to be effected is determined by the steps 9–16.

In step 17, a determination is made as to whether or not the flag NIC is 0. If the answer is yes, that is, if the engine is operating in the low engine speed region, the flag NIC is set to 1 at step 18, and then in step 19 the values pf the correction coefficients and correction terms are calculated on the basis of the engine operating parameter values read in the step 3, while step 20 is executed wherein reading is made of values of the basic fuel injection periods TiM, TiS from the Ne-PB maps stored in the ROM 507 in FIG. 7, on the basis of the engine rotational speed Ne and the intake pipe absolute pressure PB. Then, based upon the read TiM and TiS values and the calculated values of correction coefficients and correction terms, calculations are executed of the main injection period TOUTM and the sub injection period TOUTS, by the use of the aforementioned equations (1), (2), and the calculated period values are stored into the RAM 508 in FIG. 7, at step 21.

Then, it is determined at step 22 whether or not the flag NHNE shows 1. When the engine speed Ne is lower than the predetermined value NEIC, this flag NHNE is set to 0 at step 5, while when the engine speed Ne is higher than the value NEIC, the flag is set to 1 at step 6, as noted before. If the answer to the question of step 22 is no, a flag NBHNE is set to 0 at step 23. Data corresponding to the TOUTM, TOUTS values calculated at step 21 are loaded into the counters 509, 509' at step 24, and simultaneously the counters are started at step 25, while the flag NIC is reset to 0 at step 26. Simultaneously upon starting the counters fuel injections take place to supply fuel into the cylinder determined by the steps 9–16 through the counter 509, while simultaneously supplying fuel for all the cylinders through the counter 509'. Hereinafter description is principally omitted with respect to the injection through the sub injector. If the answer to the question of step 22 is yes, that is, when the engine speed Ne is determined to be higher than the predetermined value NEIC, the flag NIC is set to 1 at step 27, and the flag NBHNE is set to 1 at step 28. Thus, the program skips over steps 24–26. That is, the flag NBHNE showing 1 indicates that these steps 24–26 have been skipped by the program. The flag NIC set to 1 at step 18 is held at 1 all the time during calculations of the fuel injection periods TOUTM, TOUTS, and is reset to 0 upon the start of the fuel injections, at step 26. The flag NIC is also set to 1 when a TDC signal pulse interrupts the fuel quantity calculation, as hereinafter described.

In the above stated manner, when the engine is operating in the low engine speed region wherein the engine speed Ne is lower than the predetermined value NEIC, fuel quantity calculation is effected upon generation of each pulse of the TDC signal, and immediately upon completion of each calculation fuel is injected into each of the cylinders to thus perform a sequential injection, by executing the steps 1–22, and 23–26.

Next, assuming that the engine speed Ne was determined to be lower than the predetermined value NEIC in the last loop, and during execution of the steps 19-21 to calculate the correction coefficients and correction terms, and the injection periods TOUTM, TOUTS in the present loop, for instance, during execution of the calculation CAL3 in FIG. 3 referred to before, the next TDC signal pulse T4 is generated, the program immediately returns to step 1 wherein the flag NIC is determined to be 1, since it has been set to 1 in step 18 as noted before, and then at the following step 7 the flag NBHNE is determined to be 0, since it was set to 0 in step 23 in the last loop. Consequently, the above calculations at steps 19-21 are temporarily interrupted, at step 8, followed by execution of steps 2-17 in the same manner as stated before. In this event, since the flag NIC has been set to 1 at step 18, the answer to the question of step 17 is no, and then it is determined at step 29 whether or not the flag NIC shows 1, to obtain an affirmative answer. Accordingly, steps 30 and 31 are then executed to load the calculated values of the fuel injection periods TOUTM, TOUTS stored in a loop immediately preceding the interrupted last loop at step 21, and start the counters 509, 509' to start fuel injection (into the cylinder #3 in FIG. 3). Then, it is determined at step 32 whether or not the flag NBHNE shows 1. Since on this occasion the flag NBHNE was set to 0 in the last loop at step 23, the answer is no to resume the calculations suspended at step 8, at step 33, and store the resulting calculated values TOUTM, TOUTS at step 34. Then, the flag NIC is set to 2 to terminate the execution of the present loop of the program.

In the next loop which is started upon generation of the next TDC signal pulse T2 (FIG. 3), if the engine speed Ne is determined to again become lower than the predetermined value NEIC, the answer to the question of step 1 becomes negative, and accordingly steps 2-17 are executed with step 8 skipped, and then step 29 is executed to provide a negative answer since the flag NIC was set to 2 at step 35 so that steps 36 and 37 are executed. In steps 36, 37, the injection period values TOUTM, TOUTS calculated and stored at steps 33, 34 in the last loop are loaded into the counters 509, 509', and the counters are started, thus effecting injection (into the cylinder #4 in FIG. 3).

Then, the flag NBHNE is set to 0 at step 38, followed by execution of steps 18 et seq. to execute the calculation CAL2 and storage of the resulting calculated values upon generation of the present TDC signal pulse T2, thus effecting injection (into the cylinder #2) using the same calculated values.

Next, the injection manner in the high engine speed region will be explained by referring to the same flow chart of FIG. 8. Assuming that the engine speed Ne is determined to be higher than the predetermined value NEIC upon generation of the first TDC signal pulse T1 in FIG. 4, and the next TDC signal pulse T3 is generated during the calculation CAL1, steps 1-17 and 29 are executed in the same manner as stated before, and steps 30, 31 are executed to effect injection (into the cylinder #1 determined by steps 9-16) using an up-to-date fuel injection period value calculated immediately before the generation of the pulse T1. If in this event the engine speed Ne was determined to be higher than the predetermined value NEIC in the last loop, the calculation CAL1 is continued at steps 19-21 (that is, the steps 8, 33 and 34 are then not executed). When the next pulse T4 is generated after completion of the calculation CAL1, steps 36 and 37 are executed to effect injection (into the cylinder #3) using the calculated value resulting from the calculation CAL1. Then, the flag NBHNE is set to 0 at step 38, and the flag NIC is set to 1 at step 18, followed by execution of the calculation CAL4 at steps 19-21. When the next TDC signal pulse T2 is generated during the execution of the calculation CAL4, the calculation CAL4 is interrupted at step 8, and injection is effected using the calculating value resulting from the preceding calculation. At the step 32, the answer is negative so that the calculation interrupted at step 8 is resumed and the calculated value is stored at steps 33 and 34 for use in the injection at the time of generation of the next TDC signal pulse T1. In this way, in the high engine speed region a sequential injection is carried out in a manner that calculation is effected upon generation of every other pulse of the TDC signal, and the resulting calculated value is used for the injection effected immediately upon generation of the next TDC signal pulse.

The manner of executing the program of FIG. 8 will now be described according to the example of FIG. 5. The engine rotational speed Ne is determined to be lower than the predetermined value NEIC at step 4 at the time of generation of the TDC signal pulse T3, to start the calculation CAL3 at steps 19-21. When the next TDC signal pulse T4 is not generated before completion of the calculation CAL3, injection is initiated upon completion of the calculation CAL3 using the calculated value resulting therefrom, at steps 22-25, and the flag NIC is set to 0 at step 26. Then, when the engine rotational speed Ne is determined to be higher than the predetermined value NEIC at the time of generation of the next TDC signal pulse T4, then the above-mentioned calculation CAL3 has already been finished and accordingly the calculating device is at idle so that the next calculation CAL4 is started upon generation of the TDC signal pulse T4 at steps 19-21. Upon completion of the calculation CAL4, the flag NHNE is determined to be 1 at step 22, and the flags NIC and NBHNE are both set to 1 at respective steps 27 and 28. When the engine speed Ne is again determined to be higher than the predetermined value NEIC at the time of generation of the next TDC signal pulse T2 at step 4, the program proceeds through step 29 to steps 30, 31 wherein the resulting calculated value of the completed calculation CAL4 is used to start injection, and the flag NIC is set to 2 at step 35. At the time of generation of the next TDC signal pulse T1 steps 36, 37 are executed to start injection by again using the calculated value of the calculation CAL4, followed by execution of steps 19-21 to start the next calculation CAL1.

What is claimed is:

1. A fuel supply control method for an internal combustion engine having a plurality of cylinders, including calculating the quantity of fuel to be supplied to said engine in response to operating conditions of said engine, and sequentially supplying quantities of fuel corresponding to the resulting calculated values into respective corresponding ones of said cylinders, the method comprising the steps of: (a) generating pulses of a timing signal equal in number to the number of said cylinders at predetermined crank angles of said engine per one cycle of said engine; (b) detecting the rotational speed of said engine; (c) calculating the quantity of fuel to be supplied to said engine, in synchronism with generation of said timing signal; (d) determining whether or not the detected engine rotational speed is higher than a predetermined value; (e) starting the supply of fuel to said engine immediately upon completion of the calculation of the fuel quantity in step (c), when the detected engine rotational speed is determined to be lower than said predetermined value; and (f) starting the supply of fuel to said engine immediately upon generation of a first pulse of said timing signal generated immediately after completion of the calculation of the fuel quantity, when the detected engine rotational speed is determined to be higher than said predetermined value.

2. A method as claimed in claim 1, wherein when the detected engine rotational speed is determined to be higher than said predetermined value, the calculation of the fuel quantity is effected upon generation of every other pulse of said timing signal.

3. A method as claimed in claim 1, wherein said step (b) is executed upon generation of each pulse of said timing signal.

4. A method as claimed in claim 1, wherein said step (d) is executed upon generation of each pulse of said timing signal.

5. A method as claimed in claim 1, wherein said predetermined value of the engine rotational speed is set at a value assumed when the time interval between adjacent pulses of said timing signal is equal to the maximum possible time required for completing a calculation of the fuel quantity.

6. A method as claimed in claim 1, wherein said predetermined value of the engine rotational speed is set at a value assumed when the time interval between adjacent pulses of said timing signal is slightly larger than the maximum possible time required for completing a calculation of the fuel quantity.

7. A method as claimed in claim 1, wherein said predetermined value of the engine rotational speed is set at different values between the time of increase of the engine rotational speed and the time of decrease of same.

8. A method as claimed in claim 2, wherein said step (f) comprises supplying said engine with a quantity of fuel equal to a calculated value obtained by a first calculation of the fuel quantity started upon generation of one of said every other pulse of said timing signal, upon generation of each subsequent pulse of said timing signal, from a time said first calculation is completed to a time a second calculation of the fuel quantity immediately following said first calculation and started upon generation of an immediately following one of said every other pulse of said timing signal is completed.

* * * * *